(12) United States Patent
Moren

(10) Patent No.: US 9,506,569 B2
(45) Date of Patent: Nov. 29, 2016

(54) NEEDLE VALVE

(75) Inventor: Gary A. Moren, Advance, NC (US)

(73) Assignee: Hayward Industries, Inc., Elizabeth, NJ (US)

(*) Notice: Subject to any disclaimer, the term of this patent is extended or adjusted under 35 U.S.C. 154(b) by 33 days.

(21) Appl. No.: 12/955,442

(22) Filed: Nov. 29, 2010

(65) Prior Publication Data

US 2012/0132839 A1 May 31, 2012

(51) Int. Cl.
*F16K 1/04* (2006.01)
*F16K 1/36* (2006.01)
*F16K 1/38* (2006.01)

(52) U.S. Cl.
CPC . *F16K 1/04* (2013.01); *F16K 1/36* (2013.01); *F16K 1/385* (2013.01)

(58) Field of Classification Search
CPC .. F16K 11/0712; F16K 31/041; F16K 3/243; F16K 31/0655
USPC ......... 251/264, 357, 333, 334, 324, 77, 291, 251/292; 16/422
See application file for complete search history.

(56) References Cited

U.S. PATENT DOCUMENTS

| | | | |
|---|---|---|---|
| 2,573,623 A | 10/1951 | Stover | |
| 2,876,982 A * | 3/1959 | Snider | 251/88 |
| 2,920,861 A * | 1/1960 | Hartmann | 251/357 |
| 2,924,232 A * | 2/1960 | Michaels | 137/315.07 |
| 2,952,439 A | 9/1960 | Koons | |
| 3,006,597 A * | 10/1961 | Hookway | 251/88 |
| 3,155,367 A * | 11/1964 | Gifford | 251/86 |
| 3,222,027 A * | 12/1965 | Gilleeny | 251/264 |
| 3,317,183 A | 5/1967 | Szwargulski | |
| 3,326,521 A | 6/1967 | Murray | |
| 3,472,481 A | 10/1969 | Spies, Jr. | |
| 4,009,865 A * | 3/1977 | Davlin | 251/318 |
| 4,114,851 A * | 9/1978 | Shivak et al. | 251/88 |
| 4,119,296 A | 10/1978 | Scapes | |
| 4,183,500 A * | 1/1980 | Nightingale | 251/335.1 |
| 4,257,575 A * | 3/1981 | Runyan | 251/292 |
| 4,270,727 A * | 6/1981 | Norman | 251/63.4 |
| 4,336,920 A * | 6/1982 | Murray | 251/357 |
| 4,421,298 A * | 12/1983 | Kujawski | 251/368 |
| 4,501,407 A * | 2/1985 | Murray | 251/129.15 |
| 4,525,910 A * | 7/1985 | Boehmer | 29/890.127 |
| 4,570,665 A * | 2/1986 | Zimmerly | 137/240 |
| 4,721,284 A | 1/1988 | Bankard | |
| 6,695,280 B2 * | 2/2004 | Litzenberg et al. | 251/63.5 |
| 6,820,857 B1 | 11/2004 | Lancaster | |
| 7,146,824 B2 * | 12/2006 | Ohno | 62/292 |
| 2005/0109974 A1 * | 5/2005 | Antunes Guimaraes et al. | 251/357 |

* cited by examiner

*Primary Examiner* — Marina Tietjen
*Assistant Examiner* — Andrew J Rost
(74) *Attorney, Agent, or Firm* — McCarter & English, LLP

(57) ABSTRACT

Disclosed herein is an improved needle valve, where, in some preferred embodiments, the needle valve includes a stem having a ball linkage and a seat having a ball linkage housing. The ball linkage can be snap-fit to the seat, and the ball linkage and ball linkage housing cooperate to form a ball-and-socket joint. In some embodiments, an axis is formed at least in part by the stem, and the ball-and-socket joint allows rotation of the seat about the axis and inhibits rotation of the seat about another axis. A gap may be provided between the seat and the stem to accommodate deformation of the seat. Also disclosed herein is an improved needle valve, where, in some preferred embodiments, a stem and a handle are provided with mating geometry and a biased snap-fit mechanism to facilitate ease of assembly.

33 Claims, 10 Drawing Sheets

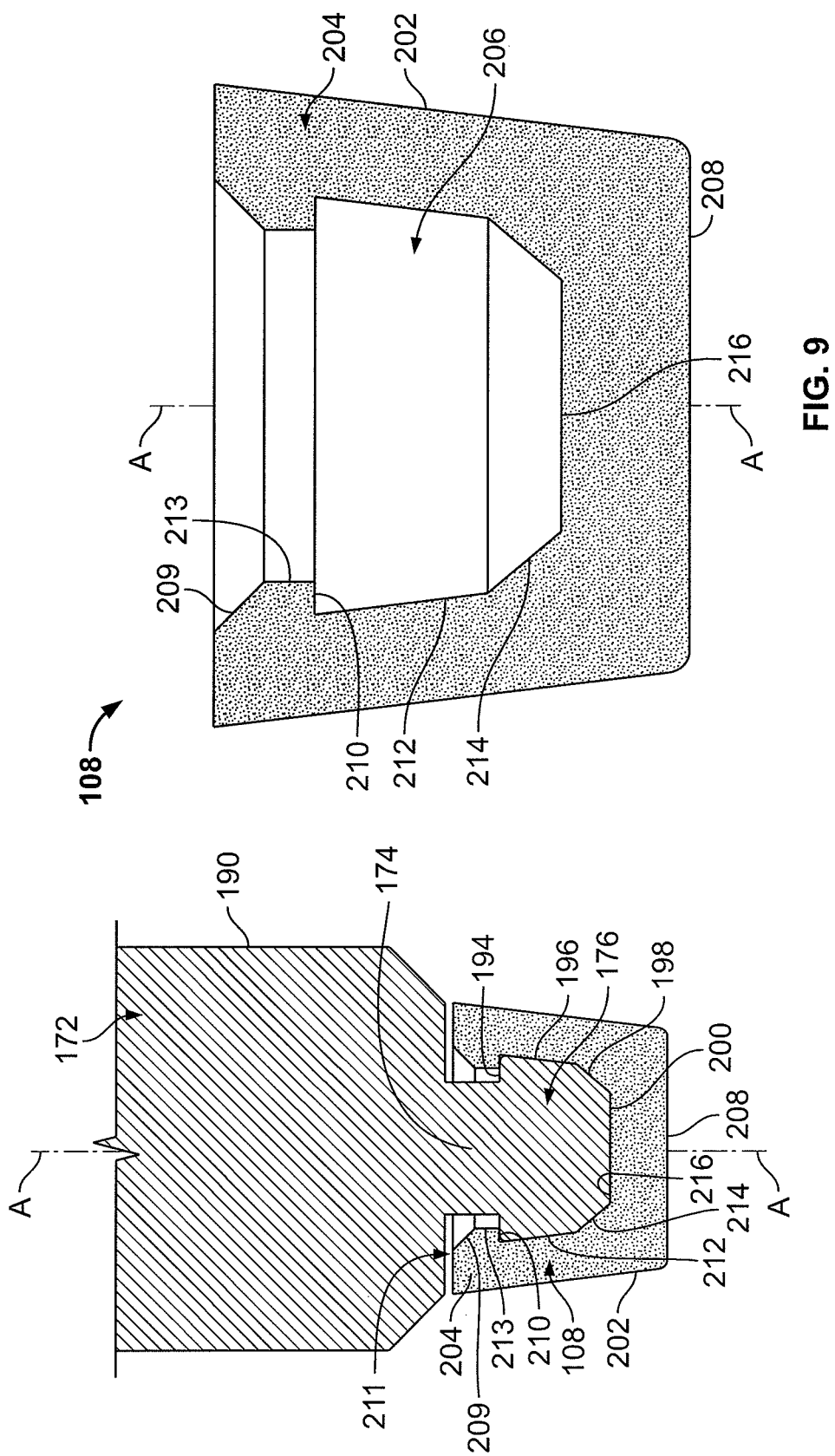

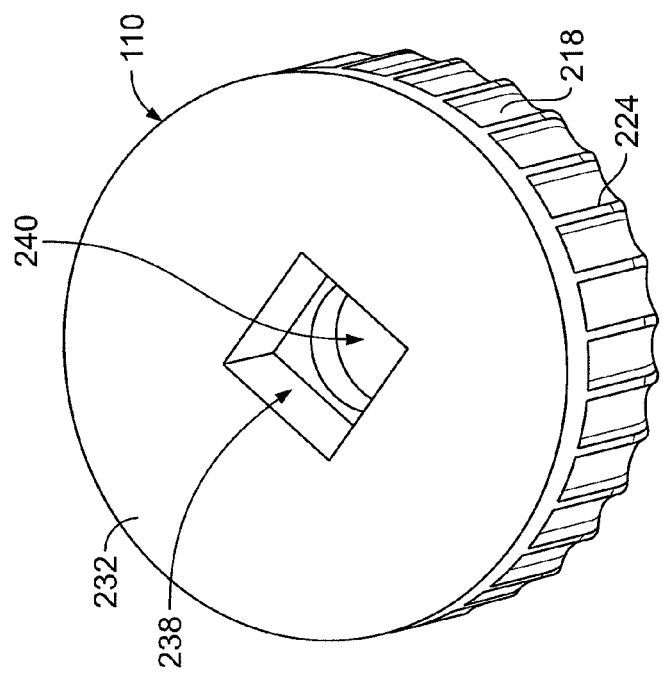
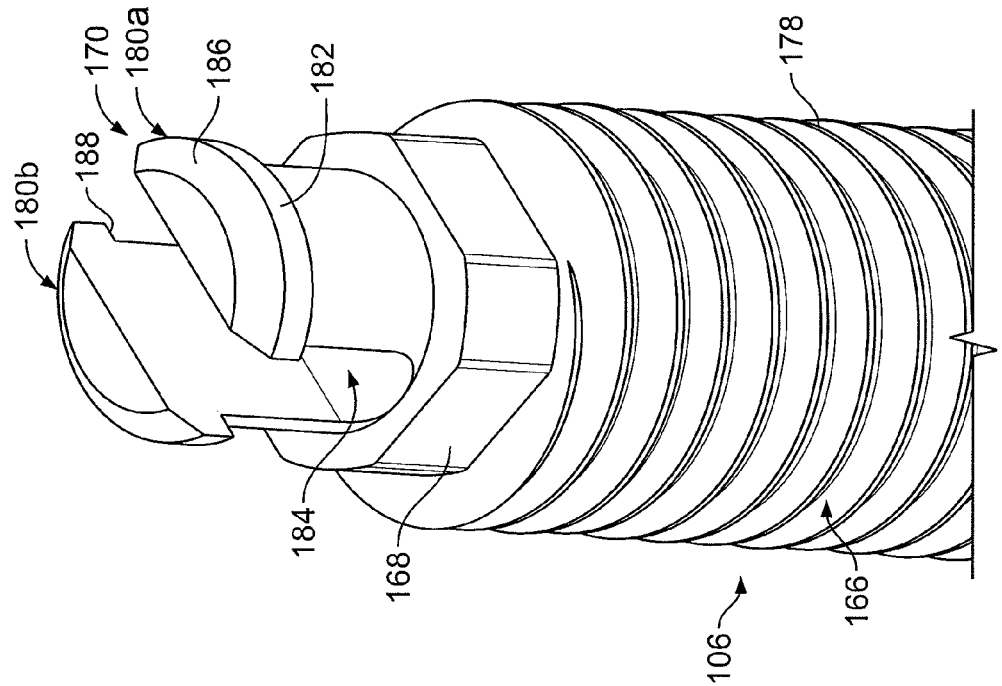

NEEDLE VALVE

FIELD OF THE INVENTION

The present invention relates generally to a needle valve assembly for inhibiting fluid flow therethrough, and, more specifically, to a needle valve assembly including a stem and a seat therefor.

BACKGROUND OF THE INVENTION

Needle valves are known in the art for controlling fluid flow through a pathway of reduced diameter relative to the inlet and outlet orifices, for example. Flow is typically in one direction, and a user can typically restrict or increase the flow rate through the valve and bring the flow to a desired level. In some circumstances, flow may be limited to one or more drops over a period of time.

As shown in FIG. 1, a needle valve 10 of the prior art is shown. The prior art valve 10 of FIG. 1 includes a body 12, a seat 14, an o-ring 16, a stem 18, a bonnet 20, and a thumbwheel 22. The seat 14 of the prior art valve 10 of FIG. 1 is integrally attached to the body 12 at an internal cavity thereof, which can be achieved through molding the seat 14 in place against the body 12. During operation of the prior art valve 10 of FIG. 1, a user rotates the thumbwheel 22 causing the stem 18 to be driven downward through the bonnet 20, where a distal end of the stem 18 alternately engages/disengages the molded-in-place seat 14. The stem 18 imparts compressive loads on the seat 14, resulting in a seal restricting flow through the body 12. This type of stem 18 is known as a "rising stem" type.

The body 12 of the prior art valve 10 of FIG. 1 is one piece with a geometry that includes an inlet, outlet, top entry port, and internal flow path. The top entry port of the prior art valve 10 of FIG. 1 allows for the insertion of an assembly comprised of the stem 18 and bonnet 20. The top entry port of the prior art valve 10 of FIG. 1 contains female threading which engages the male threading of the bonnet 20, securing the bonnet 20 thereto. Alternatively, it is known in the art for a bonnet and a top entry port to be connected through a flanged configuration. The bonnet 20 of FIG. 1, has internal female threading which engages the male threading of the stem 18. This allows for a user to rotate the thumbwheel 22, attached to one end of the stem 18, and drive the stem 18 downward through the bonnet 20, or lift it upward. It is known in the art to attach the thumbwheel 22 to the stem 18 using ultrasonic welding. The stem 18 can be driven to a fully downward position, at which point the stem 18 engages a seat 14.

Referring to FIG. 1, it is known in the art for the seat 14 to be molded with or otherwise physically attached to the valve body 12. FIG. 1 shows a molded-in-place seat 14 which is affixed to the interior of the body 12. In such an arrangement, when the stem 18 is driven fully downward it engages the seat 14 and, through compressive loads imparted on the seat 14, seals the orifice restricting the flow through the valve 10.

It is known in the art to provide seats that are integrally formed with, attached to, and/or assembled with a valve body. It is also known in the art to provide seats that are integrally formed with, attached to, and/or assembled with a valve stem. Attachment of the seat might include fasteners, adhesives, sleeves, press-fits, or over-molding of malleable rubber or plastic materials onto rigid metal or plastic substrates. However, what is needed in the art are systems and methods for improvements to the seats of needle valves.

SUMMARY OF THE INVENTION

The present invention overcomes the disadvantages and shortcomings of the prior art by providing improved needle valves.

In preferred embodiments, the valve includes a body having an internal flow path with a body seal area and further includes a stem having a ball linkage. A seat is selectively movable by the stem amongst a plurality of positions with respect to the body seal area. The seat defines a ball linkage housing configured to receive the ball linkage. In some embodiments, the ball linkage and the ball linkage housing form a snap fit. In some embodiments, the ball linkage and the ball linkage housing can form a ball-and-socket joint, which may allow rotation of the stem about an axis defined in part by the stem, while inhibiting rotation of the seat about such axis, and the ball-and-socket joint can preferably inhibit rotation of the seat about another axis. A gap may be formed between the stem and the seat to facilitate assembly and to accommodate deformation of the seat.

Also disclosed herein are improvements to needle valves concerning an interface between a valve stem and a handle. In some preferred embodiments, any suitable seat can be provided, and a stem and complementary handle are provided. The stem and handle can be provided with mating geometry, such as a shaped head in the stem and a corresponding hole in the handle for receiving the shaped head and such that rotation of the handle translates to the stem. A fastener can be provided for securing the handle to the stem, such as a snap-fit mechanism extending through the hole from the shaped head to secure the handle thereto.

Additional features, functions and benefits of the disclosed needle valve and methods in connection therewith will be apparent from the detailed description which follows, particularly when read in conjunction with the accompanying figures.

BRIEF DESCRIPTION OF THE DRAWINGS

For a more complete understanding of the present invention, reference is made to the following detailed description of an exemplary embodiment considered in conjunction with the accompanying drawings, in which:

FIG. 8 is a sectional view of the stem and the seat of FIGS. 2-7 taken along section line 8-8 of FIG. 7;

FIG. 9 is a sectional view of the seat of FIGS. 2-8;

FIG. 10 is a top perspective view of the stem of FIGS. 2-8 showing an enlarged view of area 10 of FIG. 2;

FIG. 11 is a bottom perspective view of the thumbwheel of FIG. 2; and

DETAILED DESCRIPTION OF THE INVENTION

Figure 1:
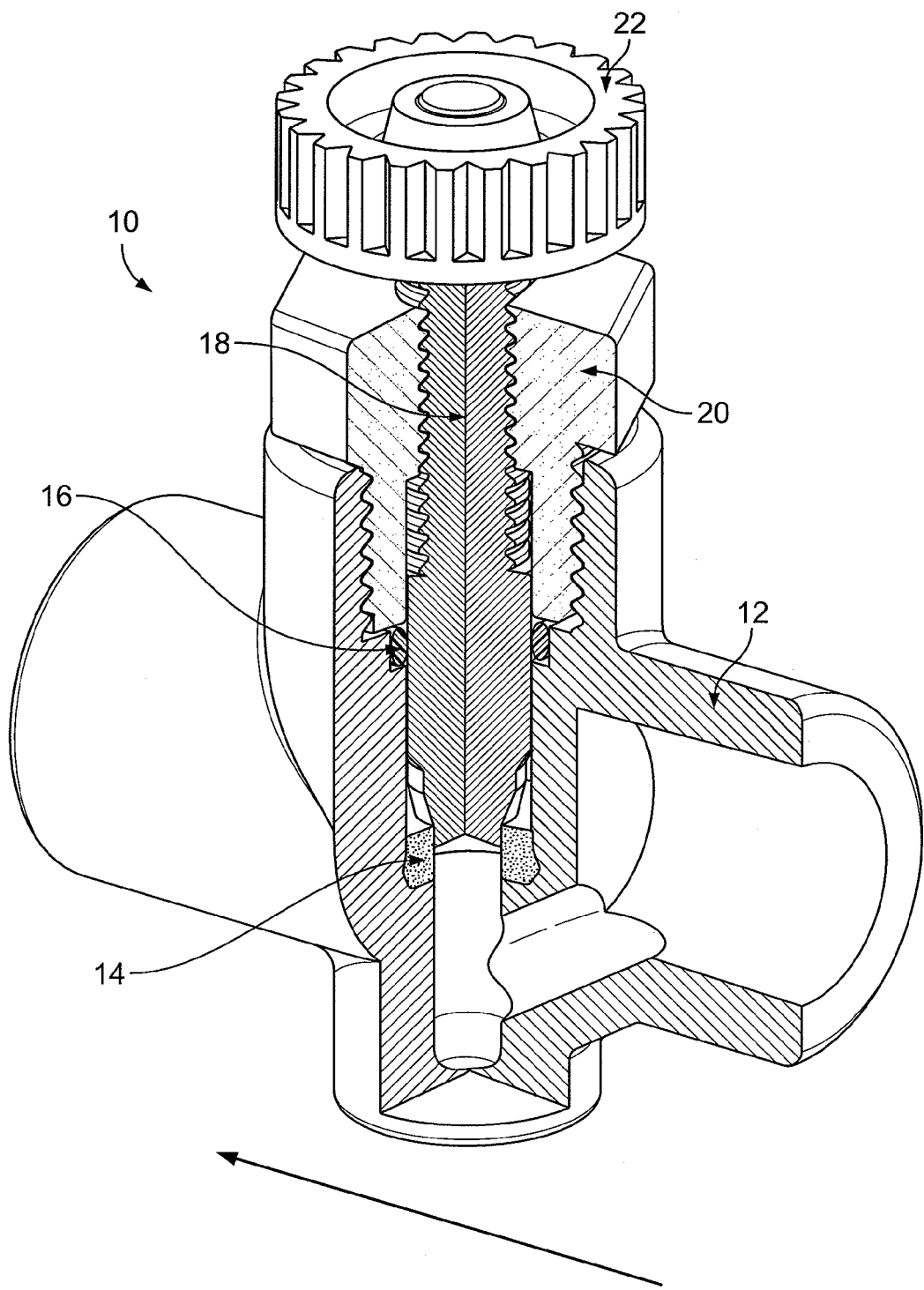
FIG. 1 is a partially-sectioned front perspective view of a prior art valve including a molded-in-place seat.
Figure 2:
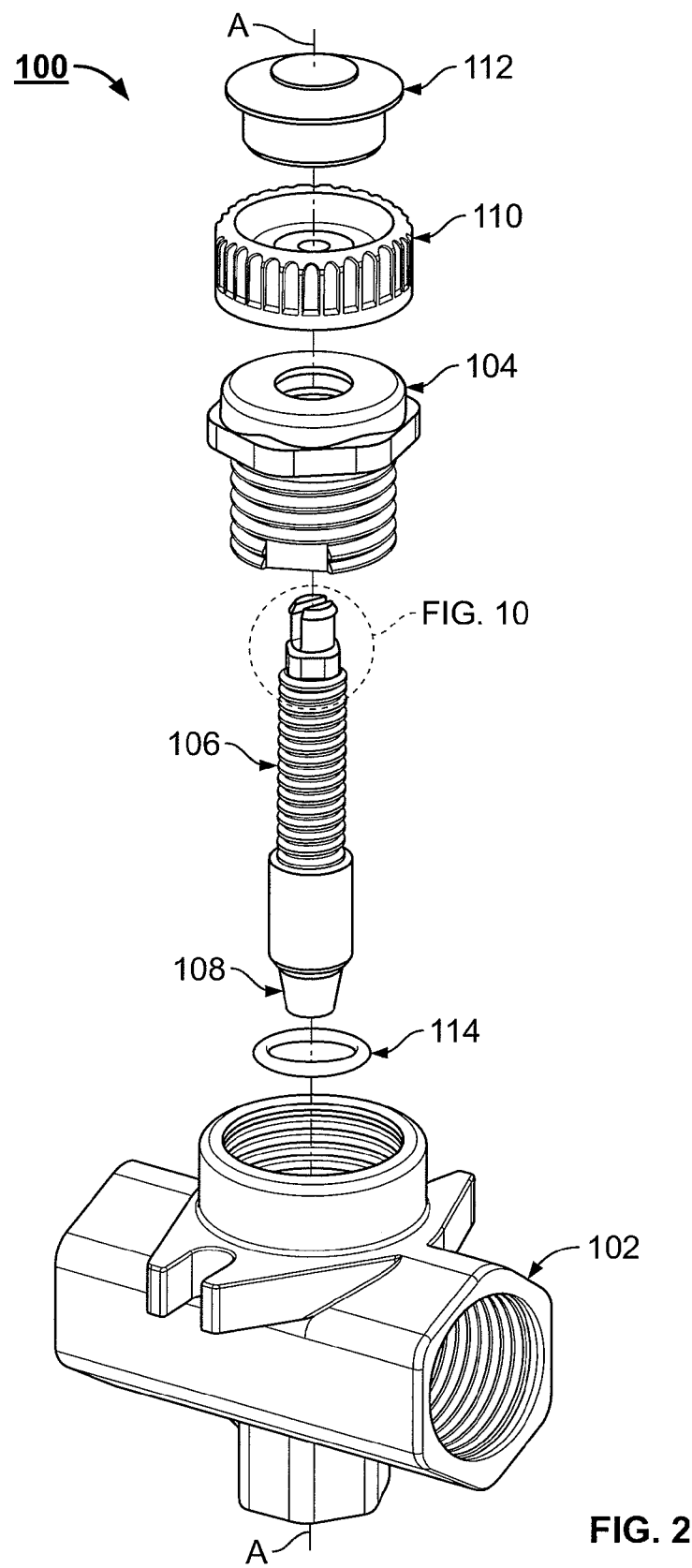
FIG. 2 is a partially-exploded front perspective view of a needle valve constructed in accordance with an exemplary embodiment of the invention.
Figure 3:
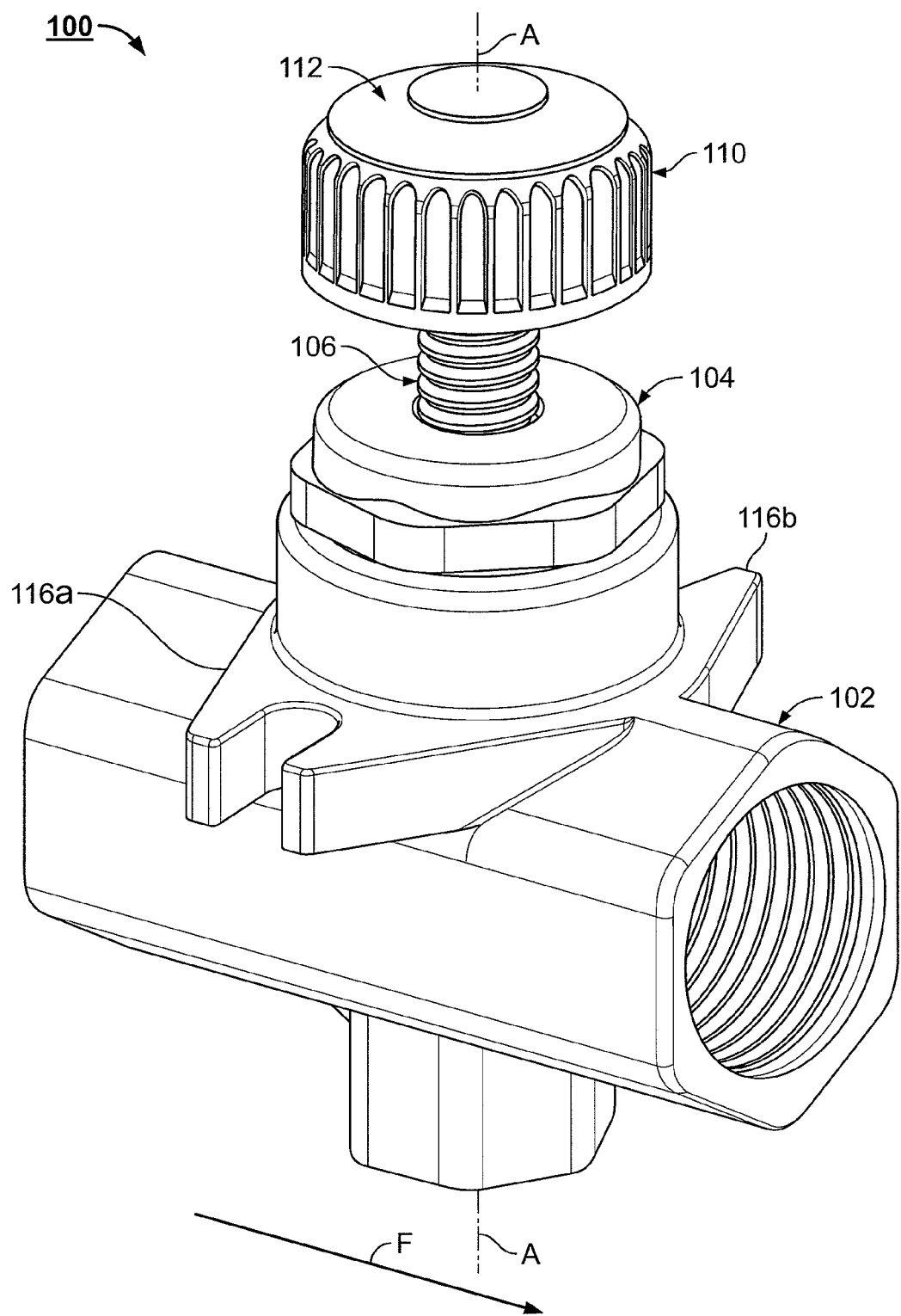
FIG. 3 is a front perspective view of the needle valve of FIG. 2.
Figure 4:
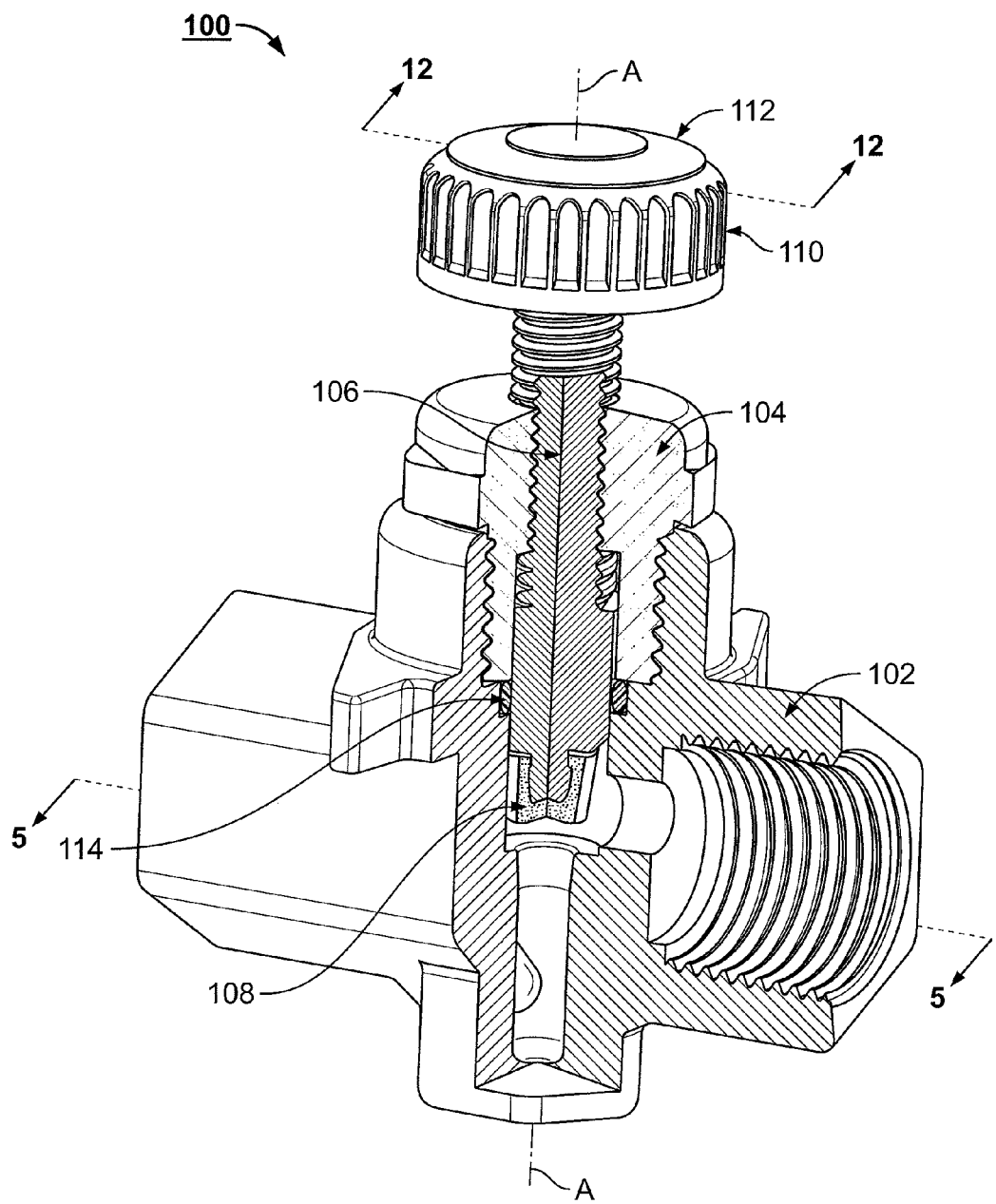
FIG. 4 is a partially-sectioned front perspective view of the needle valve of FIGS. 2 and 3.

Referring to FIGS. 2-12, a needle valve 100 is shown in accordance with an exemplary embodiment of the invention. The needle valve 100 includes a body 102, a bonnet 104, a stem 106 extending along axis A, a seat 108, a thumbwheel 110, a bezel 112, and an o-ring 114, each of which will be discussed below in detail.

In the embodiment of FIGS. 2-12, the needle valve 100 includes the body 102. The body 102 comprises a plurality of panel mount slots 116a, 116b, an inlet 118, an outlet 120, a fluid path 122 extending therebetween, a first counter bore 126, a second counter bore 128, and an entry port 132. In some embodiments, the fluid path 122 can have three areas including a first fluid path segment 124a, a second fluid path segment 124b, and an outlet fluid pathway 130.

Figure 5:
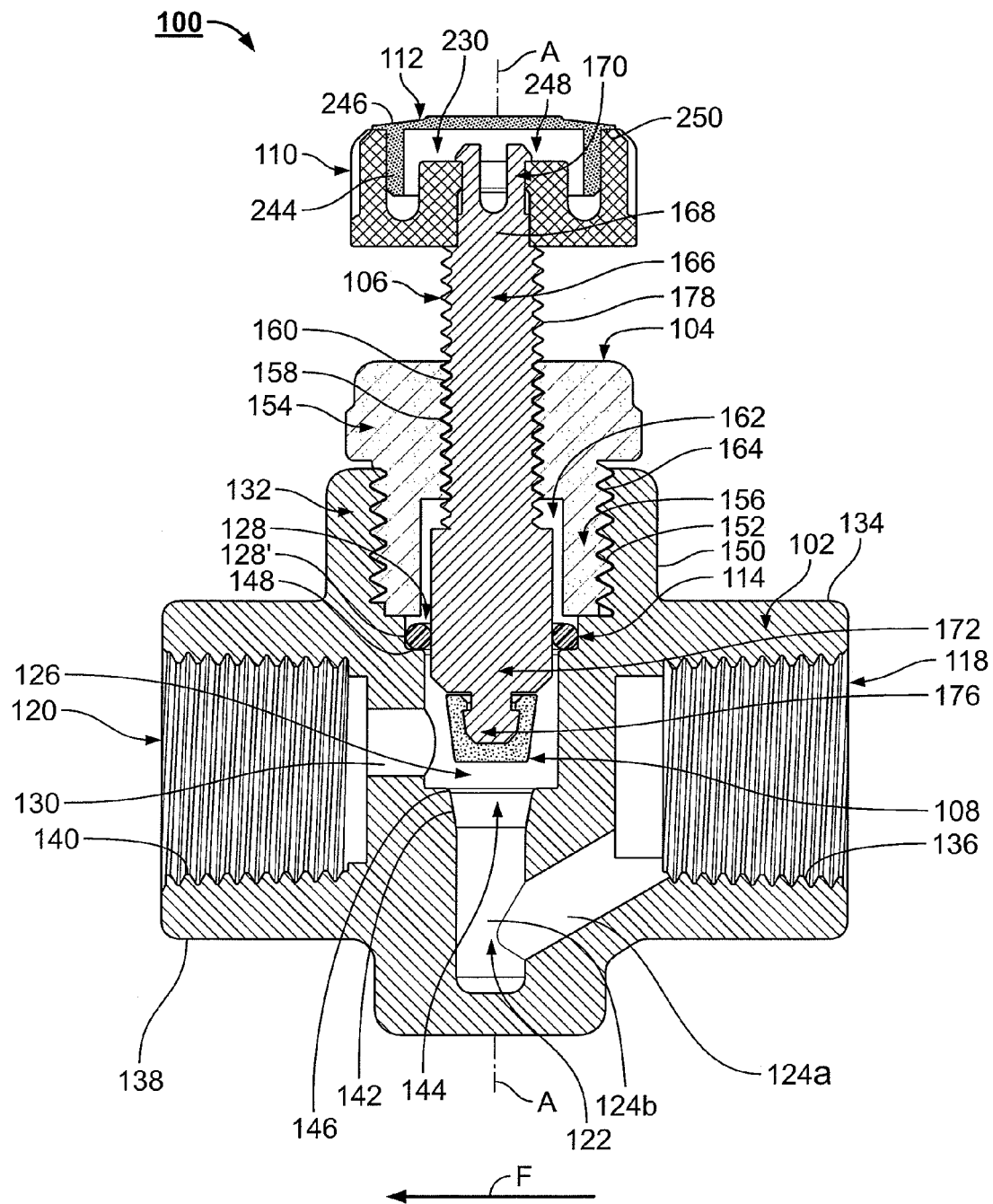
FIG. 5 is a sectional view of the needle valve of FIGS. 2-4 taken along section line 5-5 of FIG. 4 with the valve being shown in a partially open position.
Figure 6:
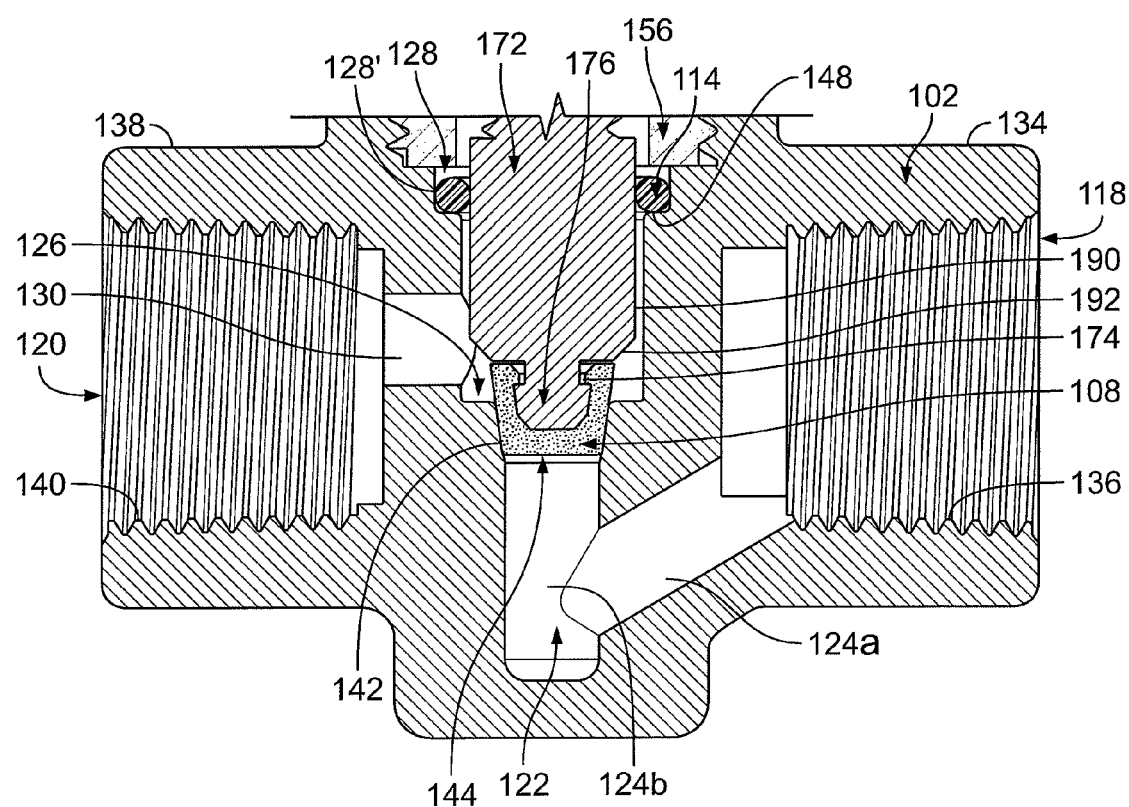
FIG. 6 is a sectional view of the needle valve of FIGS. 2-5 shown in a closed position.
Figure 7:
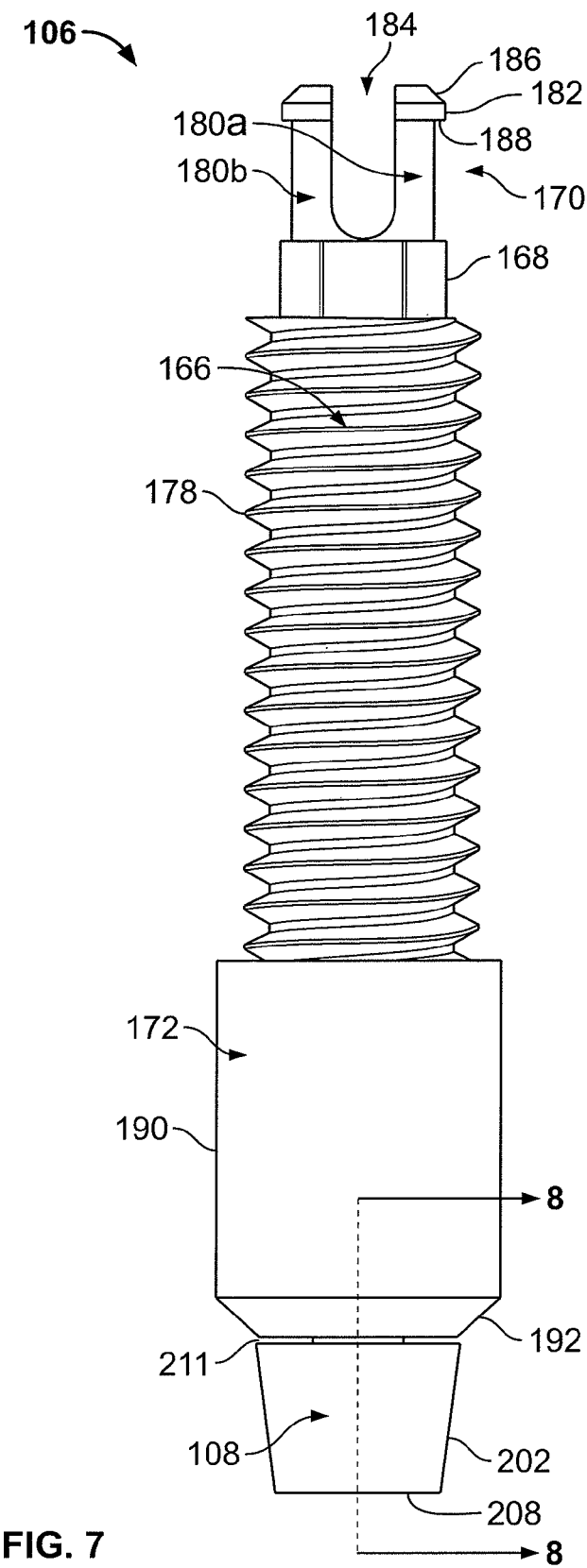
FIG. 7 is an elevational view of a stem and a seat of the needle valve of FIGS. 2-6.
Figure 12:
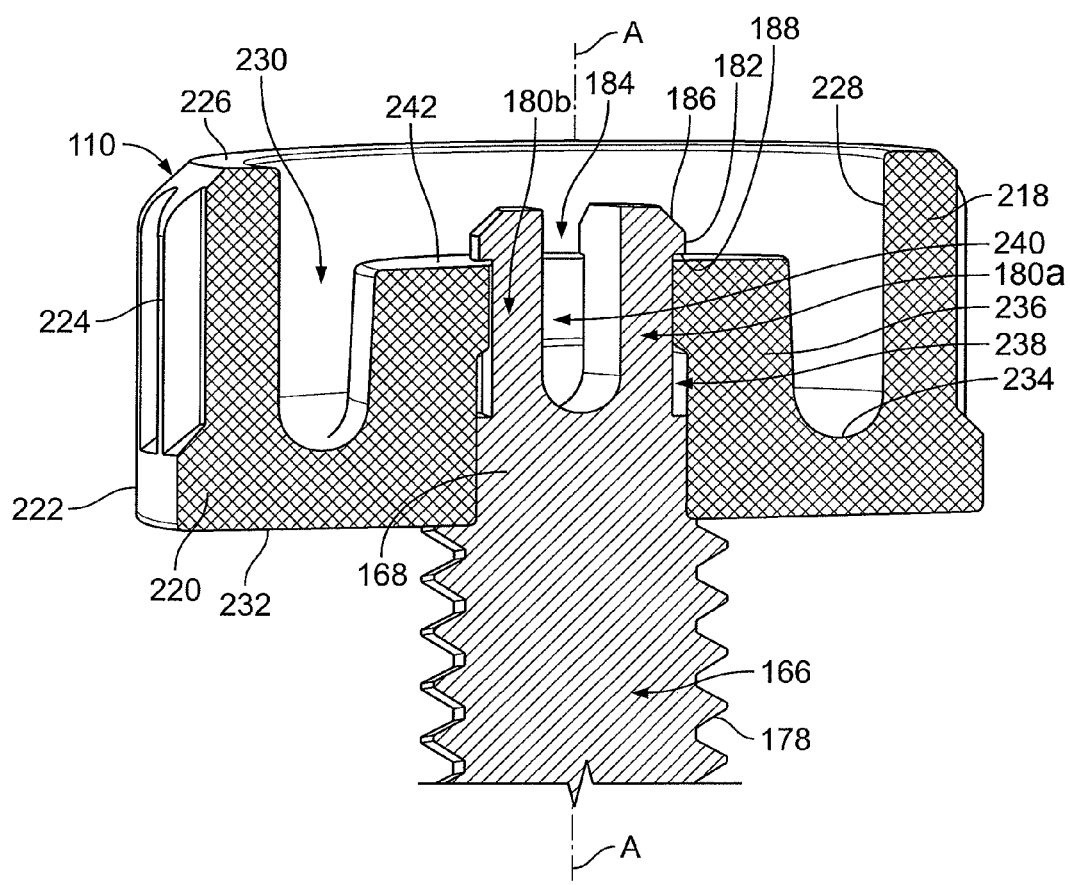
FIG. 12 is a sectional view of the thumbwheel and stem of FIG. 2 taken along section line 12-12 of FIG. 4.

Referring to FIGS. 2-6, the body 102 is generally monolithic in form and includes external walls 134, 138 which can be hexagonally shaped along the longitudinal axis of the overall flow path F of the body 102. The panel mount slots 116a, 116b are formed on the exterior of the body 102 and allow for the body 102 to be mounted where desired. The body 102 includes the inlet 118 and the outlet 120, which can be provided with means for securing the body 102 in fluid communication with a pipe. As shown in FIGS. 5-6, for example, such means can include a threaded internal inlet surface 136 and a threaded internal outlet surface 140, which may be national pipe thread tapered threads in varying diameters such as, but not limited to, ¼", ⅜", or ½".

The inlet 118 is in fluid communication with the fluid path 122, which comprises a first fluid path segment 124a, a second fluid path segment 124b, and the outlet fluid pathway 130. The first fluid path segment 124a can be a ¼" diameter descending path angled at approximately twenty-six degrees (26°) into the center of the body 102 where it converges with the second fluid path segment 124b which can be vertical in nature and aligned (e.g., coincident) with the axis A. Fluid flows through the second fluid path segment 124b and to a body seal area 144, which extends just beyond the horizontal midplane of the body 102 and is in fluid communication with a first counterbore 126 extending along the axis A. The first counter bore 126 allows for translation along axis A of the various valve sealing mechanisms, e.g., the stem 106 and the seat 108, and is provided as part of the fluid path 122, communicating fluid to the outlet fluid pathway 130 and subsequently the outlet 120 and any attached piping. In an open position of the valve 100, fluid flows from the inlet 118 where it descends through the first fluid pathway 124a traveling to the center of the body 102 before turning vertically upward with the second fluid pathway 124b. The flow then turns at a substantially right angle, for example, and to the outlet fluid pathway 130 and the outlet 120.

The first counter bore 126, having a first radius (measured from axis A), provides an accommodation space for the stem 106 and is proximate to a second counter bore 128, which extends along the axis A from the first counter bore 126 and which has a second radius greater than the first radius. The second counter bore 128 forms an o-ring seat 148 which holds the o-ring 114. Proximate to the second counter bore 128 is the entry port 132, which includes an annular wall 150 and interior female threading 152. The entry port 132 is generally a protrusion extending from the body 102 and is preferably cylindrical in nature as defined by the annular wall 150. Disposed on the interior wall of the entry port 132 is female threading 152 which allows for securing the bonnet 104 therein.

The bonnet 104 includes a cap 154, which can be hexagonal in shape, for example, and an annular extension 156. The bonnet 104 has a through hole 158 that includes interior female threading 160 and that extends through the cap 154. The annular extension 156 defines therein a piston housing 162, and the through hole 158 extends thereto. The annular extension 156 has external male threading 164. The external male threading 164 of the bonnet 104 engages the female threading 152 of the entry port 132 securing the bonnet 104 therein. The interior female threading 160 of the cap 154 engages the stem 106, as shall be discussed in greater detail below.

Referring to FIGS. 5-8, for example, the stem 106 preferably includes a shaft 166, a shaped head 168, a snap-fit mechanism 170, a piston 172, a neck 174, and a ball linkage 176. The snap-fit mechanism 170 and head 168 are at a first end of the stem 106 proximal the thumbwheel 110 and will be discussed in detail below. The shaft 166 includes external threading 178 which engages the interior female threading 160 of the bonnet 104. This engagement facilitates translation of the stem 106 through the bonnet 104 when rotated. Proximate to the shaft 166 is the piston 172, which includes a substantially smooth cylindrical piston wall 190 and a tapered edge 192. The piston 172 is substantially located within the piston housing 162 of the bonnet 104 and extends through the center of the o-ring 114. This positioning allows for the cylindrical piston wall 190 to engage the o-ring 114, forcing the o-ring 114 to expand and engage the second counter bore wall 128'. This results in compression of the o-ring 114 between the piston 172 and the second counter bore wall 128', forming a seal between the interior of the body 102 and the area external the entry port 132, e.g., a piston seal. The tapered edge 192 is formed along the cylindrical piston wall 190 edge and facilitates insertion of the piston 172 through the o-ring 114. The piston 172 is also sufficient in length to create a seal with the o-ring 114 at all times, including when the valve is in a fully closed and a fully open position.

Referring to FIG. 8, the neck 174 extends from the piston 172 opposite the shaft 166, and a ball linkage 176 extends from the neck 174. The neck 174 can be provided as a post that spaces the ball linkage 176 from the piston 172. The neck 174 can be smaller in diameter than the ball linkage 176 to create an undercut above the ball linkage 176. In preferred embodiments, the ball linkage 176 can function as the "ball" component of a ball-and-socket joint with the seat 108. It is understood that the term "ball" does not require a spherical shape, and those skilled in the art shall understand the variations that the ball can be provided with. In preferred embodiments, the ball linkage 176 is roughly conical in geometry with a truncated end forming an end wall 200. The ball linkage 176 geometry includes a shoulder 194, which is planar and extends radially outward from the neck 174, a conical taper 196 extending from the shoulder 194 opposite the neck 174, a conical chamfer 198 extending from the conical taper 196 opposite the shoulder 194, and an end wall 200 extending radially inward from the conical chamfer 198, with the cross-section of the ball linkage 176 preferably being uniform about axis A. In some embodiments, the conical taper 196 extends at an approximately five degree (5°) angle from the shoulder 194 toward the central axis A, while at approximately three-quarters of the distance of the ball linkage 176 from the shoulder 194, the conical chamfer 198 begins and descends at an approximately fifty degree (50°) angle toward the central axis A.

Referring to FIGS. 8 and 9, the ball linkage 176 engages the seat 108. The seat 108 is generally frustoconical in shape and includes a cylindrical tapered exterior wall 202, a seat collar 204, a ball linkage housing 206, and an exterior truncated end wall 208. The seat 108 forms a void which acts as a ball linkage housing 206 that can function as the "socket" component of a ball-and-socket joint in which the ball linkage 176 is received. The ball linkage housing 206 forms a cylindrical chamfered wall 212, a cylindrical chamfered edge 214 extending from the chamfered wall 212, and an interior end wall 216 extending radially inward from the chamfered edge 214, with the cross-section of the seat 108 being uniform about central axis A. The internal profile of the seat 108, as defined by the cylindrical chamfered wall 212, the cylindrical chamfered edge 214, and the end wall 216 corresponds with the conical taper 196, the conical chamfer 198, and the end wall 200 of the ball linkage 176 so as to mate therewith. This complementary geometry allows for the ball linkage 176 to engage the seat 108 so that a load imposed thereon will be concentrated through the cylindrical chamfered wall 212 and the cylindrical chamfered edge 214.

The seat collar 204 comprises an annular neck 213, a chamfer lead-in 209 and a planar shoulder 210. The seat 108 is resiliently flexible between a relaxed state and a flexed state. The chamfer lead-in 209 allows for easy insertion of the ball linkage 176 into the seat 108, which flexes from the relaxed state to the flexed state to allow for insertion therein. When the ball linkage 176 is inserted into the seat 108, and contained in the ball linkage housing 206, the planar shoulder 210 of the seat 108 engages the shoulder 194 of the ball linkage 176, joining the two components mechanically, and the seat returns to the relaxed state from the flexed state.

When the ball linkage 176 is joined with the seat 108, a gap 211 is formed between the seat collar 204 and the piston 172. In preferred embodiments, this gap 211 provides clearance for any deformation of the seat 108 due to compressive forces in use and enhances the attachment of the seat 108 and the ball linkage 176. The gap 211 facilitates alignment of the seat 108 into place about the ball linkage 176, such that the seat 108 forms a snap-fit with the ball linkage 176. In preferred embodiments, the gap 211 facilitates concentration of loading from the ball linkage 176 through the cylindrical chamfered wall 212 and cylindrical chamfered edge 214, rather than the other portions of the piston 172, for example. As shown in FIG. 8, in some embodiments the annular neck 213 of the seat 108 can be spaced apart from the neck 174 of the stem 106 to form a space between the neck 213 and the neck 174.

The seat 108 is removable from the ball linkage 176 using a prying device (pliers, for example), to forcibly open the seat 108 from the relaxed state. The gap 211 accommodates the insertion of a prying device between the seat 108 and the stem 106. The prying device can be inserted in the gap 211 and used to pry the seat 108 from the ball linkage 176. This facilitates repair of the valve 100 and replacement of the seat 108, for example.

The housing 206 has rotational freedom around the central axis A, and is preferably restricted in rotation about other axes, e.g., horizontal axes. When joined, the planar shoulder 210 of the seat 108 engages the shoulder 194 of the ball linkage 176 (and wall 200 engages wall 216) to form a fit that inhibits rotation about axes in a multitude of planes, e.g., inhibiting rotation about axes intersecting axis A (e.g., horizontal axes, when axis A is vertically-aligned). In this regard, the interface of the seat 108 and the ball linkage 176 inhibits misalignment with the housing 206 during valve closing and sealing. Some rotation of the ball linkage housing 206 of seat 108 with respect to the ball linkage 176 is permitted about axis A. Limited slippage therebetween is permitted, such that, after the stem 106 has almost fully tightened the valve 100 closed, the stem 106 can turn the ball linkage 176 about axis A with respect to the seat 108 being stationary about axis A, while the seat 108 is further deformed into the gap 211.

Referring to FIGS. 5, 7, and 10-12, the distal end of the stem 106, opposite the ball linkage 176, includes a shaped head 168 and a snap-fit mechanism 170. The shaped head 168 may be a square shape as shown in FIG. 10 and/or any other shape suitable for the purposes herein described. For example, the shaped head 168 can be an irregular shape, such as a diamond, a triangle, etc. (so as to inhibit slip between the shaped head 168 and the female bore 238). The snap-fit mechanism 170 includes a plurality of cantilevered snap-fit collets 180a, 180b with a gap 184 therebetween. It should be understood that each one of the collets 180a, 180b is preferably substantially the same as the other one thereof, and that discussion of the collet 180a, for example, is equally applicably to the collet 180b. The collets 180a, 180b each contain a collar 182 having a chamfered lead-in edge 186 and a planar shoulder 188. The chamfered lead-in edge 186 allows for the corresponding one of the collets 180a, 180b to be properly introduced to the thumbwheel 110, while the planar shoulder 188 allows for the corresponding one of the collets 180a, 180b to be properly secured to the thumbwheel 110. The gap 184 permits the collets 180a, 180b to be deformed toward each other when being assembled with the thumbwheel 110. In some embodiments, the snap-fit collets 180a, 180b may be forced together to allow removal of the thumbwheel 110.

The thumbwheel 110 can be cylindrical in shape as defined by the thumbwheel wall 218, and is generally monolithic in form with a bottom wall 220. The thumbwheel wall 218 comprises an annular exterior surface 222, an external shoulder 226, and an annular interior surface 228, and defines an internal void 230. The thumbwheel wall 218 does not require an upper wall and forms an internal void 230 which is open. The annular exterior surface 222 has ridges 224 formed thereon and spaced evenly around the perimeter, which act as a grip during thumbwheel 110 rotation. The bottom wall 220 has an exterior bottom surface 232 and an interior bottom surface 234, with a protrusion 236 projecting from the interior bottom surface 234 into the internal void 230, forming a planar shoulder 242 extending radially inward to axis A. In some embodiments, the protrusion 236 can be approximately two-thirds the overall height of the thumbwheel 110 and has a female bore 238 and a circular through hole 240 formed therein. The female bore 238 can be approximately two-thirds the height of the protrusion 236 in depth and extends through the bottom wall 220 and partially into the protrusion 236. The female bore 238 can be square shaped or otherwise shaped to compliment the geometry of the shaped head 168 of the stem 106 so as to inhibit slippage therewith during rotation of the stem 106. The circular through hole 240 extends through the protrusion 236 and into the female bore 238, so that the two are in communication. The circular through hole 240 and protrusion 236 facilitate attachment of the thumbwheel 110 to the stem 106.

The thumbwheel 110 engages the top of the stem 106. The thumbwheel 110 is an example of a handle for rotating the stem 106. The circular through hole 240 engages the snap-fit mechanism 170. The snap-fit mechanism 170 is forced into the through hole 240, whereby the edge of the through hole 240 acts against the chamfered lead edge 186 of each snap-fit collet 180a, 180b forcing the snap-fit collets 180a, 180b toward each other, allowing for insertion into the circular through hole 240. When inserted, the planar shoulder 242 of the protrusion 236 engages the planar shoulder 188 of the each collet 180a, 180b. This engagement inhibits the thumbwheel 110 from being inadvertently removed from the stem 106, preventing axial displacement of the thumbwheel 110 while handling and operating the valve 100. The female bore 238 of the thumbwheel 110 engages the shaped head 168 of the stem 106. Interaction of the shaped head 168 with the female bore 238 rotationally locks the stem 106 and the thumbwheel 110 together, such that as the thumbwheel 110 is rotated, the stem 106 also rotates.

Referring to FIGS. 2-5, a bezel 112 is attached to the thumbwheel 110. The bezel 112 acts as a cap for the thumbwheel 110, covering the internal void 230 of the thumbwheel 110, inhibiting entry of contaminants into voids 230, 248 and inhibiting tampering with the snap-fit mechanism 170. The bezel 112 is cylindrically shaped as defined by an annular wall 244 with a chamfered cap 246. The annular wall 244 defines a void 248 (overlapping in some respect with void 230), which provides space for various parts of the thumbwheel 110 and the stem 106, including the protrusion 236 and the snap-fit mechanism 170. The annular wall 244 can have an external radius just smaller than the radius of the annular interior surface 228 of the thumbwheel 110. This allows for the bezel 112 to be inserted into and attached to the thumbwheel 110. When the bezel 112 is combined with the thumbwheel 110, the chamfered cap 246 extends beyond the annular wall 244 creating a planar shoulder 250 which engages the external shoulder 226 of the thumbwheel 110.

In some embodiments, the body 102, bonnet 104, stem 106, thumbwheel 110, and bezel 112 may be injection molded plastic components made from thermoplastics such as polyvinyl chloride (PVC) or glass-filled polypropylene (GFPP). The seat 108 may be machined or injection molded polytetrafluoroethylene (PTFE), for example. The seat 108 may be constructed from an injection molded thermoplastic or natural elastomer, e.g., rubber. The o-ring 114 may be injection molded or transfer molded elastomer such as ethylene propylene diene monomer rubber (EPDM) or fluoroelastomer, for example. Any materials can be used for the components of the needle valve 100 that are suitable for the purposes herein described.

To assemble the needle valve 100, the seat 108 is placed around the ball linkage 176 of the stem 106 and light force is applied. This forces the conical chamfer 198 of the ball linkage 176 to engage the chamfer lead-in 209 of the seat 108, flexing the seat 108 open from the relaxed state into the flexed state, and causing the ball linkage 176 to enter the ball linkage housing 206 of the seat 108 for containment therein, and allowing the seat 108 to return to the relaxed state. In exemplary embodiments, this results in the conical taper 196 being flush with the cylindrical chamfered wall 212 and the conical chamfer 198 to be flush with the cylindrical chamfered edge 214. The housing 206 is retained in combination with the ball linkage 176 at least in part through engagement of the planar shoulder 210 of the seat 108 with the shoulder 194 of the ball linkage 176 and engagement of walls 200, 216.

In assembling the valve 100, the stem 106 (with seat 108) and the bonnet 104 are combined in a subassembly. In this regard, the stem 106 is threaded into the bonnet 104 whereby the external threading 178 of the stem shaft 166 engages the interior female threading 160 of the bonnet 104. Initially, the stem 106 is placed in a fully open position whereby the piston 172 is fully contained within the piston housing 162.

The o-ring 114 is placed into the second counter bore 128 of the body 102. The subassembly of the bonnet 104 and stem 106 (with seat 108) is inserted and threaded into the entry port 132 of the body 102. This threading occurs whereby the exterior male threading 164 of the bonnet 104 engages the interior female threading 152 of the entry port 132. During this insertion, the stem 106 and the seat 108 are inserted through the o-ring 114. This results in the cylindrical piston wall 190 engaging the o-ring 114 and forcing the o-ring 114 to expand around the piston 172, while also being outwardly contained by the second counter bore 128 walls. This results in the formation of a seal. The o-ring 114 is compressed as the bonnet 104 and stem 106 subassembly is threaded fully into the entry port 132. Optionally, the bonnet 104 may be tightened into place by utilizing a wrench, or other device, on the cap 154, which may be hexagonally shaped to facilitate such tightening.

The thumbwheel 110 can be snapped into place at the end of the stem 106 by aligning the edges of the female bore 238 in the thumbwheel 110 with the flat walls of the shaped head 168 of the stem 106. Force is applied to the thumbwheel 110 so that each chamfered lead edge 186 of the snap-fit collets 180a, 180b contacts the circular through hole 240 forcing the collets 180a, 180b toward each other and allowing the snap-fit mechanism 170 to be fully inserted into the circular through hole 240. This facilitates engagement of the shaped head 168 with the female bore 238 and the planar shoulder 188 of each collet 180a, 180b to engage the planar shoulder 242 of the protrusion 236, thus restricting the thumbwheel 110 from being removed from the stem 106. Once the thumbwheel 110 is fully engaged with the stem 106, the bezel 112 can be pressed into place whereby the annular wall 244 of the bezel 112 is within the internal void 230 of the thumbwheel 110.

In use, the needle valve 100 can act as a throttle for fluid flow through the body 102 and is capable of fully restricting flow therethrough. Operation of the needle valve 100 can be performed by turning the thumbwheel 110 clockwise to reach the fully closed position and counterclockwise to reach the fully open position. The thumbwheel 110 can also be partially turned, placing the needle valve 100 in an intermediate position, achieving a throttling effect whereby the flow through the needle valve 100 is metered.

As the thumbwheel 110 is rotated toward a closed position, as shown in FIG. 6, for example, the stem 106 traverses the bonnet 104 and the seat 108 is moved closer to the body seal area 144. The body seal area 144 includes a guide fillet 146 at the top edge which acts to centralize and guide the seat 108 into the body seal area 144. As the thumbwheel 110 is rotated, the seat 108 engages the body seal area 144. The cylindrical tapered exterior wall 202 of the seat 108 contacts the conical wall 142 which defines the body seal area 144. As the seat 108 begins to engage the body seal area 144, the ball linkage 176 will continue to rotate independently about axis A inside of the seat 108 for a fraction of a rotation, such that the ball linkage 176 is rotated with respect to the seat 108. Rotation of the thumbwheel 110 results in a tightening of the valve as the conical taper 196 and the conical chamfer 198 of the ball linkage 176 transfer the vertical loads applied thereto outward into the seat 108, compressing it against the conical wall 142 to enhance the seal. In exemplary embodiments, this reduces friction between the seat 108 and the body seal area 144 and allows the ball linkage 176 to rotate independently of the seat 108. This compression preferably results in a greater retention force of the seat 108 to the ball linkage 176. In some embodiments, the independent rotation of the ball linkage 176 and the seat 108 promotes even wear of the seat 108 over a period of time, because the seat 108 may be in a different rotational position about axis A within the body seal area 144 during each cycle.

Regarding the open position, as shown in FIG. 5, for example, the uni-directional flow through the valve 100, e.g., up, and into, the seat 108, enhances the retention of the seat 108 on the ball linkage 176. Fluid exerts pressure on the exterior truncated end wall 208 of the seat 108 acting to push the seat 108 toward the ball linkage 176. The seat 108 may deform as it is pushed by the fluid which is accommodated by the gap 211. This pressure causes for the end wall 200 of the ball linkage 176 to engage the interior end wall 216 of the seat 108, enhancing the retention of the seat 108 on the ball linkage 176.

It will be understood that the embodiments of the present invention described herein are merely exemplary and that a person skilled in the art may make many variations and modifications without departing from the spirit and the scope of the invention. All such variations and modifications, including those discussed above, are intended to be included within the scope of the invention as defined by the appended claims.

What is claimed is:

1. A needle valve, comprising:
a body having an internal flow path with a body seal area defined by a conical wall;
a stem having a shaft with an end wall and a ball linkage; and
a seat selectively movable by said stem amongst a plurality of positions, including a closed position in said conical wall defining said body seal area and an at least partially open position with respect to said body seal area, said seat, at least when in an open position, defining with said end wall a gap therebetween;
wherein said seat defines a ball linkage housing with a cylindrical chamfered wall configured to receive said ball linkage to form a ball-and-socket joint, said ball linkage, when in said closed position in said conical wall, concentrating a load from said stem outward through said cylindrical chamfered wall against said conical wall, deforming said seat into said gap;
wherein an axis is defined at least in part by said stem, and wherein said ball-and-socket joint permits rotation of said ball linkage about said axis with respect to said ball linkage housing, such that, after said stem has substantially tightened said seat in the closed position, a slippage between said ball linkage and said ball linkage housing permits said stem to turn said ball linkage about said axis, deforming said seat into said gap; and
wherein said ball-and-socket joint inhibits rotation of said seat about another axis different than said axis.

2. The needle valve of claim 1, wherein said axis is defined at least in part by said ball linkage of said stem.

3. The needle valve of claim 1, wherein said seat is resiliently flexible between a flexed position for receiving said ball linkage and a relaxed position for retaining said ball linkage.

4. The needle valve of claim 1, wherein said seat forms a snap-fit with said ball linkage.

5. The needle valve of claim 1, wherein said seat is formed of polytetrafluoroethylene.

6. The needle valve of claim 1, wherein said stem includes a neck extending from said end wall and wherein said ball linkage extends from said neck.

7. The needle valve of claim 1, wherein said seat includes a collar having a chamfer lead-in to facilitate insertion of said ball linkage into said seat.

8. The needle valve of claim 7, wherein said collar defines with said end wall said gap therebetween.

9. The needle valve of claim 1, wherein said body having said body seal area is integrally formed.

10. The needle valve of claim 1, wherein said body seal area includes a guide fillet.

11. The needle valve of claim 1, wherein said ball linkage includes a conical taper and a conical chamfer and wherein said ball linkage housing includes a cylindrically chamfered edge, said conical taper contacting the cylindrical chamfered wall, and said conical chamfer contacting said cylindrically chamfered edge, when said ball linkage is secured within said ball linkage housing, and wherein said load concentrated outward through said cylindrical chamfered wall against said conical wall is concentrated outward through said cylindrical chamfered wall and said cylindrically chamfered edge.

12. The needle valve of claim 1, wherein said seat is removable from said stem.

13. The needle valve of claim 1, wherein said another axis intersects said axis.

14. The needle valve of claim 13, wherein, when said axis is vertically-aligned, said another axis is a horizontal axis.

15. A needle valve, comprising:
a body having an inlet, an outlet, and an internal flow path therebetween with a body seal area defined by a conical wall;
a stem including a shaft having an end wall and further including a neck extending from said end wall and a ball linkage extending from said neck; and
a seat having a ball linkage housing with a cylindrical chamfered wall and forming a snap-fit with said ball linkage, said seat being movable by said stem with respect to said body seal area and, at least in an open position, forming a gap with said end wall to accommodate deformation of said seat when said seat is in a closed position compressed within said body seal area with said cylindrical chamfered wall in said conical wall;
wherein said shaft, said neck, and said ball linkage are in substantial alignment with an axis at least partially defined by said stem, and wherein said ball linkage housing and said ball linkage form a ball-and-socket joint;
wherein said ball-and-socket joint permits rotation of said ball linkage about said axis with respect to said ball linkage housing, such that, after said stem has substantially tightened said seat in the closed position, a slippage between said ball linkage and said ball linkage housing permits said stem to turn said ball linkage about said axis, deforming said seat into said gap; and
wherein said ball-and-socket joint inhibits rotation of said seat about another axis different than said axis.

16. The needle valve of claim 15, wherein said ball linkage, when in said closed position in said conical wall, concentrates a load from said stem outward through said cylindrical chamfered wall against said conical wall, deforming said seat into said gap.

17. The needle valve of claim 15, wherein said ball linkage includes a conical taper and a conical chamfer and wherein said ball linkage housing includes a cylindrically chamfered edge, said conical taper contacting the cylindrical chamfered wall, and said conical chamfer contacting said cylindrically chamfered edge, when said ball linkage is secured within said ball linkage housing, and wherein said ball linkage, when in said closed position, concentrates a load from said stem outward through said cylindrical chamfered wall and said cylindrically chamfered edge against said conical wall, deforming said seat into said gap.

18. The needle valve of claim 15, wherein said another axis intersects said axis.

19. The needle valve of claim 18, wherein, when said axis is vertically-aligned, said another axis is a horizontal axis.

20. A needle valve, comprising:
a body having an internal flow path with a body seal area defined by a conical wall;
a stem (i) having a shaft with an end wall and a ball linkage and (ii) configured to translate rotational motion of a handle to rotational motion of said ball linkage; and
a seat selectively movable by said stem amongst a plurality of positions, including a closed position in said conical wall defining said body seal area and an at least partially open position with respect to said body seal area, said seat, at least when in an open position, defining with said end wall a gap therebetween;
wherein said seat defines a ball linkage housing with a cylindrical chamfered wall configured to receive said ball linkage to form a ball-and-socket joint, said ball linkage, when in said closed position in said conical wall, concentrating a load from said stem outward through said cylindrical chamfered wall against said conical wall, deforming said seat into said gap;
wherein an axis is defined at least in part by said stem, and wherein said ball-and-socket joint permits rotation of said ball linkage about said axis with respect to said ball linkage housing, such that, after said stem has substantially tightened said seat in the closed position, a slippage between said ball linkage and said ball linkage housing permits said stem to turn said ball linkage about said axis, deforming said seat into said gap; and
wherein said ball-and-socket joint inhibits rotation of said seat about another axis different than said axis.

21. The needle valve of claim 20, wherein said axis is defined at least in part by said ball linkage of said stem.

22. The needle valve of claim 20, wherein said seat is resiliently flexible between a flexed position for receiving said ball linkage and a relaxed position for retaining said ball linkage.

23. The needle valve of claim 20, wherein said seat forms a snap-fit with said ball linkage.

24. The needle valve of claim 20, wherein said seat is formed of polytetrafluoroethylene.

25. The needle valve of claim 20, wherein said stem includes a neck extending from said end wall and wherein said ball linkage extends from said neck.

26. The needle valve of claim 20, wherein said seat includes a collar having a chamfer lead-in to facilitate insertion of said ball linkage into said seat.

27. The needle valve of claim 26, wherein said collar defines with said end wall said gap therebetween.

28. The needle valve of claim 20, wherein said body having said body seal area is integrally formed.

29. The needle valve of claim 20, wherein said body seal area includes a guide fillet.

30. The needle valve of claim 20, wherein said ball linkage includes a conical taper and a conical chamfer and wherein said ball linkage housing includes a cylindrically chamfered edge, said conical taper contacting the cylindrical chamfered wall, and said conical chamfer contacting said cylindrically chamfered edge, when said ball linkage is secured within said ball linkage housing, and wherein said load concentrated outward through said cylindrical chamfered wall against said conical wall is concentrated outward through said cylindrical chamfered wall and said cylindrically chamfered edge.

31. The needle valve of claim 20, wherein said seat is removable from said stem.

32. The needle valve of claim 20, wherein said another axis intersects said axis.

33. The needle valve of claim 32, wherein, when said axis is vertically-aligned, said another axis is a horizontal axis.

* * * * *